(12) United States Patent
He

(10) Patent No.: US 7,697,541 B2
(45) Date of Patent: Apr. 13, 2010

(54) SERVICE SCHEDULING UNIT AND A METHOD THEREOF

(75) Inventor: Jianfei He, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 826 days.

(21) Appl. No.: 10/584,513

(22) PCT Filed: Dec. 22, 2004

(86) PCT No.: PCT/CN2004/001494

§ 371 (c)(1),
(2), (4) Date: Jun. 23, 2006

(87) PCT Pub. No.: WO2005/062513

PCT Pub. Date: Jul. 7, 2005

(65) Prior Publication Data

US 2007/0165646 A1 Jul. 19, 2007

(30) Foreign Application Priority Data

Dec. 24, 2003 (CN) .................. 2003 1 0121797

(51) Int. Cl.
*H04L 12/56* (2006.01)
(52) U.S. Cl. .................. 370/395.4; 370/355; 370/389
(58) Field of Classification Search .................. 370/355, 370/389, 236, 230; 710/317
See application file for complete search history.

(56) References Cited

U.S. PATENT DOCUMENTS

| | | | | |
|---|---|---|---|---|
| 5,596,730 A | * | 1/1997 | Sekine | 710/317 |
| 6,721,315 B1 | * | 4/2004 | Xiong et al. | 370/389 |
| 2002/0196784 A1 | * | 12/2002 | Masuda | 370/355 |
| 2003/0026250 A1 | | 2/2003 | Fang | 370/386 |
| 2005/0175004 A1 | * | 8/2005 | Russell et al. | 370/389 |
| 2008/0291832 A1 | * | 11/2008 | Bordogna et al. | 370/236 |

FOREIGN PATENT DOCUMENTS

| | | |
|---|---|---|
| CN | 1391736 A | 1/2003 |
| EP | 1 248 420 A2 | 10/2002 |

* cited by examiner

*Primary Examiner*—Chi H Pham
*Assistant Examiner*—Albert T Chou
(74) *Attorney, Agent, or Firm*—Ladas & Parry LLP

(57) ABSTRACT

This invention discloses a service scheduling unit and the method thereof, which performs scheduling for the packet service that comes from the line unit and the data service access processing unit in the digital communication system, and the service scheduling unit includes: a mapping module, a de-mapping module, an encapsulating module, a decapsulating module and a packet scheduling module. After entering the service scheduling unit, the services needing to be scheduled go through the mapping/de-mapping module and the encapsulating/decapsulating module, arrive at the scheduling module for final scheduling This method of scheduling the services can achieve the 1+1 or 1:1 protect function of the service scheduling module. The usage of this method can achieve different granularities of the mapping/de-mapping, different protocol encapsulating and can efficiently decrease the total cost of the system.

14 Claims, 4 Drawing Sheets

SERVICE SCHEDULING UNIT AND A METHOD THEREOF

CROSS-REFERENCE TO RELATED APPLICATIONS

This application is the U.S National Stage of International Application No. PCT/CN2004/001494, filed on Dec. 22, 2004, which claims priority to Chinese Patent Application No. 200310121797.2, filed Dec. 24, 2003, the disclosure of which is incorporated herein by reference in its entirety.

FIELD OF THE INVENTION

The present invention relates to a digital communication field, and particularly to a service scheduling unit and a service scheduling method.

BACKGROUND OF THE INVENTION

As data services gradually increase, the conventional Synchronous Digital Hierarchy (SDH) transmission technology has gained a progress correspondingly. The Next Generation SDH (NG SDH) technology, represented by the Virtual Concatenation, the Link Capacity Adjustment Scheme (LCAS) and the Generic Framing Procedure (GFP), has boosted the evolvement of a conventional SDH unit, which mainly provides Time Division Multiplexing (TDM) services, into a Multi-Service Transfer Platform (MSTP).

Meanwhile, in the field of data communication, requirements for operability and manageability are increasingly prominent. The Virtual Private Network (VPN) technology, particularly Layer 2 VPN (L2 VPN), has become the basic on which the data communication becomes operable. Accordingly, common L2 VPN technology includes Q-Tag (embedded)-in-Q-Tag (q-in-q), Multi-Protocol Label Switching (MPLS) L2 VPN, etc.

Here, the q-in-q is used for achieving the purpose of a separation between data streams of different users through using a tag in addition to the tag of Virtual Local Area Network (VLAN) as defined in the 802.1q.

In short, the MPLS L2 VPN differentiates between different data streams through encapsulating a user data packet and using a so-called label in the encapsulation so that a separation between the data streams of different users can be performed.

The above two technologies will be commonly referred to as L2 VPN label technology hereafter, unless indicated otherwise.

There are various implementation technologies to apply an L2 VPN service scheduling on the MSTP, dependent upon different system configurations.

FIG. 1 shows an L2 VPN-service scheduling method of prior art, in which services from between different line units and local Ethernet data services are scheduled on the same board by a cross-connecting unit.

FIG. 2 shows another L2 VPN-service scheduling method of prior art, which, in comparison with the method shown in FIG. 1, further includes a data exchanging plane to perform a data exchange between data service access processing units, however, the units connected with the cross-connecting unit are still the data service access processing units.

It is obvious from above that there exist the following disadvantages in the prior art.

1. The function of service access and the function of service scheduling are not separated from each other, and there is an absence of an independent service scheduling unit. In case data service access is not needed for a node, i.e., only the service scheduling is needed, the cost of the board for the data service access will be a waste.

2. In case there is a data service access at a data service interface, it is difficult for a data service access processing unit to achieve a "1+1" protection due to the limitation of the data service interface. Since the function of scheduling plays a very important role in a network, and a redundant protection is almost compulsively required, and such drawback is rather serious.

SUMMARY OF THE INVENTION

The present invention provides a service scheduling unit which individually achieves the function of service scheduling, and separates the function of service access from the function of service scheduling.

The present invention also provides a packet service scheduling method which can achieve a "1+1" protection or a "1:1" protection for the service scheduling unit.

An embodiment of the present invention aims to provide a service scheduling unit, which may establish a data channel connection with one end of a cross-connecting unit in a digital communication system, and perform a service scheduling for packet services of a data service access processing unit and a line unit that establish a data channel connection with the other end of the cross-connecting unit, comprising: a de-mapping module, for receiving a virtual container or virtual container group from the cross-connecting unit in the system, and to extract an encapsulated data stream from the virtual container or the virtual container group for completing separation of the encapsulated data stream therefrom; a decapsulating module, for decapsulating the encapsulated data stream from the de-mapping module into an independent data frame; a packet scheduling module, provided with multiple output ports, to receive the decapsulated data frame from the decapsulating module, read a label from the data frame, determine a corresponding output port based upon the label, and forward the data frame via the output port; an encapsulating module, for receiving the data frame forwarded by the packet scheduling module and to encapsulate the data frame at the Data Link Layer; and a mapping module, for receiving the encapsulated data frame and to map the data frame to the virtual container or the virtual container group of the cross-connecting unit.

The service scheduling unit may further comprise a fault alarming module for monitoring the service scheduling unit and report an abnormal status to the cross-connecting unit.

The mapping module and the de-mapping module may be integrated into a mapping/de-mapping module, and the encapsulating module and the decapsulating module may be integrated into an encapsulating/decapsulating module.

A plurality of channels may be provided between the encapsulating/decapsulating module and the mapping/de-mapping module and between the encapsulating/decapsulating module and the scheduling module.

The mapping/de-mapping module may further comprise a selection module, and comprise a VC4 mapping/de-mapping and virtual concatenation processing circuit, a TU3 pointer processing circuit, a VC3 mapping/de-mapping and virtual concatenation processing circuit, a TU12 pointer processing circuit and a VC 12 mapping/de-mapping and virtual concatenation processing circuit connected sequentially, and the selection module may be connected with the three virtual concatenation processing circuits to select one of the three so as to perform scheduling between the services of the virtual container or the virtual container group with different granularities.

The encapsulating/decapsulating module may further comprise a GFP CID identifying module, and for a GFP fame from a different physical channel find a CID field in an extension head in the GFP frame, and forward the GFP frame directly to a corresponding physical channel in accordance with a value of the CID field.

The encapsulating/decapsulating module may further comprise a first selection module, a second selection module and multiple protocol encapsulating/decapsulating circuits, wherein the first selection module may be connected with the mapping/de-mapping module and select one of the multiple protocol encapsulating/decapsulating circuits, and the second selection module may be connected with the packet scheduling module and select one of the multiple protocol encapsulating/decapsulating circuits, and the multiple protocol encapsulating/decapsulating circuits may be respectively corresponding to different physical channels and perform encapsulation/decapsulation for different protocols.

The multiple protocol encapsulating/decapsulating circuits may include a GFP encapsulating/decapsulating circuit, a LAPS encapsulating/decapsulating circuit and an HDLC encapsulating/decapsulating circuit.

According to the embodiments of the present invention, there is firstly provided a packet service scheduling method that may use individual service scheduling units to perform a service scheduling for packet services from a line unit and a data service access processing unit in a digital communication system, including the steps of:

configuring two service scheduling units with identical functions and configurations to be connected with a cross-connecting unit in the digital communication system;

copying, by the cross-connecting unit, services to be scheduled from the line unit and/or the data service access processing unit to the service scheduling units which accordingly perform identical receiving, processing and transmitting procedures for the services;

in case the service scheduling units both operate normally, receiving by the cross-connecting unit identical service streams from the service scheduling units, either of which is selected and cross-scheduled to the line unit and/or the data service access processing unit in the system; and in case one of the service scheduling units fails, reporting by the failed service scheduling unit the fault to a control unit that instructs the cross-connecting unit to select the service stream from the normally-operating one.

According to the embodiments of the present invention, there is secondly provided packet service scheduling method that may use individual service scheduling units to perform a service scheduling for packet services from a line unit and a data service access processing unit in a digital communication system, including the steps of:

configuring two service scheduling units with identical functions and configurations to be connected with a cross-connecting unit in the digital communication system;

copying, by the cross-connecting unit, services to be scheduled from the line unit and/or the data service access processing unit to the service scheduling units which accordingly perform identical receiving, processing and transmitting procedures for the services;

in case the service scheduling units both operate normally, receiving by the cross-connecting unit service streams from the service scheduling units, either of which is selected and cross-scheduled to the line unit and/or the data service access processing unit in the system; and in case one of the service scheduling units fails, reporting by the failed service scheduling unit the fault to the cross-connecting unit that selects the service stream from the normally-operating one.

According to the embodiments of the present invention, there is thirdly provided a packet service scheduling method that may use individual service scheduling units to perform a service scheduling for packet services from a line unit and a data service access processing unit in a digital communication system, including the steps of:

configuring two service scheduling units with identical functions and configurations to be connected with a cross-connecting unit and the data service access processing unit in the digital communication system;

copying services to be scheduled by the cross-connecting unit and/or the data service access processing unit, to the service scheduling units that perform identical receiving, processing and transmitting procedures for the services;

in case the service scheduling units both operate normally, receiving by the cross-connecting unit identical service streams from the service scheduling units, either of which is selected and cross-scheduled to the line unit in the system, and receiving by the data service access processing unit the identical service streams from the service scheduling units, either of which is selected for processing; and in case one of the service scheduling units fails, reporting by the failed service scheduling unit the fault to a control unit that instructs the cross-connecting unit and the data service access processing unit to select the service stream from the normally-operating one.

According to the embodiments of the present invention, there is fourthly provided a service scheduling method that may use individual service scheduling units to perform a service scheduling for packet services from a line unit and a data service access processing unit in a digital communication system, including the steps of:

configuring two service scheduling units with identical functions and configurations to be connected with a cross-connecting unit and the data service access processing unit in the digital communication system;

copying services to be scheduled by the cross-connecting unit and/or the data service access processing unit, to the service scheduling units that perform identical receipt, processing and transmission procedures of the services;

in case the service scheduling units both operate normally, receiving by the cross-connecting unit service streams from the service scheduling units, either of which is selected and cross-scheduled to the line unit in the system, and receiving by the data service access processing unit the identical service streams from the service scheduling units, either of which is selected for processing; and in case one of the service scheduling units fails, reporting by the failed service scheduling unit the fault it to the cross-connecting unit and the data service access processing unit that select the service stream from the normally-operating one.

According to the embodiments of the present invention, there is fourthly provided a packet service scheduling method that may use individual service scheduling units to perform a service scheduling for packet services from a line unit and a data service access processing unit in a digital communication system, including the steps of:

configuring two service scheduling units with identical functions and configurations to be connected with a cross-connecting unit in the digital communication system;

assigning, by the cross-connecting unit, services to be scheduled from the line unit and/or the data service access processing unit to the service scheduling units;

in case the service scheduling units both operate normally, receiving by the cross-connecting unit identical service streams from the service scheduling units, which are cross-scheduled to the line unit and/or the data service access processing unit in the system; and in case one of the service scheduling units fails, reporting by the failed service scheduling unit the fault to a control unit that instructs the cross-connecting unit to switch a service originally assigned to the failed one to the normally-operating one to continue the service scheduling process.

According to the embodiments of the present invention, there is sixthly provided a packet service scheduling method that may use individual service scheduling units to perform a service scheduling for packet services from a line unit and a data service access processing unit in a digital communication system, including the steps of:

configuring two service scheduling units with identical functions and configurations to be connected with a cross-connecting unit in the digital communication system;

assigning, by the cross-connecting unit, services to be scheduled from the line unit and/or the data service access processing unit to the service scheduling units;

in case the service scheduling units both operate normally, receiving by the cross-connecting unit service streams from the service scheduling units, which are cross-scheduled to the line unit and/or the data service access processing unit in the system; and in case one of the service scheduling units fails, reporting by the failed service scheduling unit the fault to the cross-connecting unit that switches a service originally assigned to the failed one to the normally-operating one to continue the service scheduling process.

According to the embodiments of the present invention, there is seventhly provided packet service scheduling method that may use individual service scheduling units to perform a service scheduling for packet services from a line unit and a data service access processing unit in digital communication system, including the steps of:

configuring two service scheduling units with identical functions and configurations to be connected with a cross-connecting unit and the data service access processing unit in the digital communication system;

assigning by the cross-connecting unit and/or the data service access processing unit services, which need a scheduling, to the service scheduling units;

in case the service scheduling units both operate normally, receiving by the cross-connecting unit identical service streams from the service scheduling units, either of which is selected and cross-scheduled to the line unit in the system, and receiving by the data service access processing unit the identical service streams from the service scheduling units, either of which is selected for processing; and in case one of the service scheduling units fails, reporting by the failed service scheduling unit the fault to a control unit that instructs the cross-connecting unit and the data service access processing unit to select the service stream from the normally-operating one.

Optionally, the services assigned to the service scheduling units may have priorities, and a service with a low priority being processed may be replaced by a service with a high priority during the service switching in case a service scheduling unit fails.

According to the embodiments of the present invention, there is eighthly provided a packet service scheduling method that may use individual service scheduling units to perform a service scheduling for packet services from a line unit and a data service access processing unit in a digital communication system, including the steps of:

configuring two service scheduling units with identical functions and configurations to be connected with a cross-connecting unit and the data service access processing unit in the digital communication system;

assigning by the cross-connecting unit and/or the data service access processing unit services, which need a scheduling, to the service scheduling units;

in case the service scheduling units both operate normally, receiving by the cross-connecting unit service streams from the service scheduling units, either of which is selected and cross-scheduled to the line unit in the system, and receiving by the data service access processing unit the identical service streams from the service scheduling units, either of which is selected for processing; and in case one of the service scheduling units fails, reporting by the failed service scheduling unit the fault it to the cross-connecting unit and the data service access processing unit that switch a service originally assigned to the failed one to the normally-operating one to continue the service scheduling process.

Optionally, the services assigned to the service scheduling units may have priorities, and a service with a low priority being processed may be replaced by a service with a high priority during the service switching in case a service scheduling unit fails.

The present invention can provide the following advantageous effects.

1. Individual service scheduling units are provided in a system, which can be used to achieve a "1+1" protection or "1:1" protection.

2. By the use of a GFP CID identifying module, service scheduling can be provided on a GFP level without decapsulation, resulting in reduced scheduling time and implementation cost.

3. A mapping/de-mapping module in a service scheduling unit according to the embodiments of the present invention includes multiple virtual concatenation processing circuits to carry out mapping/de-mapping with various granularities.

4. Data encapsulation for multiple protocols can be achieved through configuring respective channels with various encapsulation protocols.

5. Since the service scheduling is processed by the individual service scheduling units, the complexity of a service-access process unit can be reduced, and the total system cost can be reduced in case there are a large number of service accesses.

6. A board may not be provided with a data service interface, and the interface cost can be reduced effectively in case no service access is required.

DETAILED DESCRIPTION OF THE EMBODIMENTS

Figure 1:
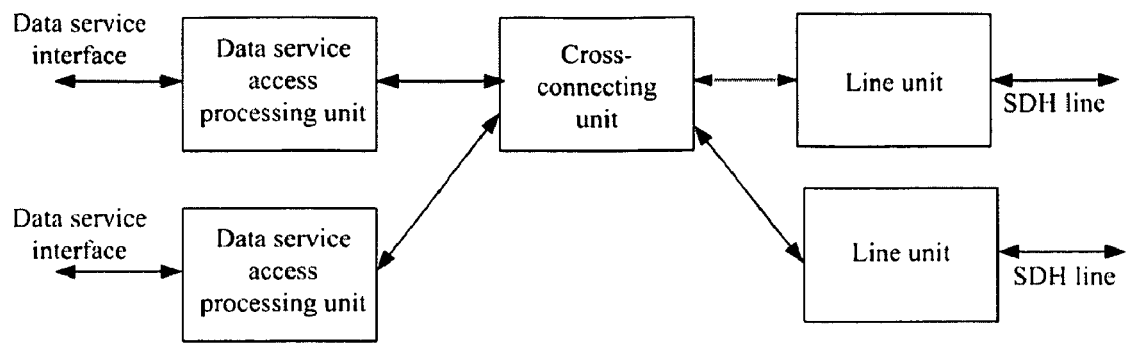
FIG. 1 is a schematic diagram of a packet service scheduling method of prior art.
Figure 2:
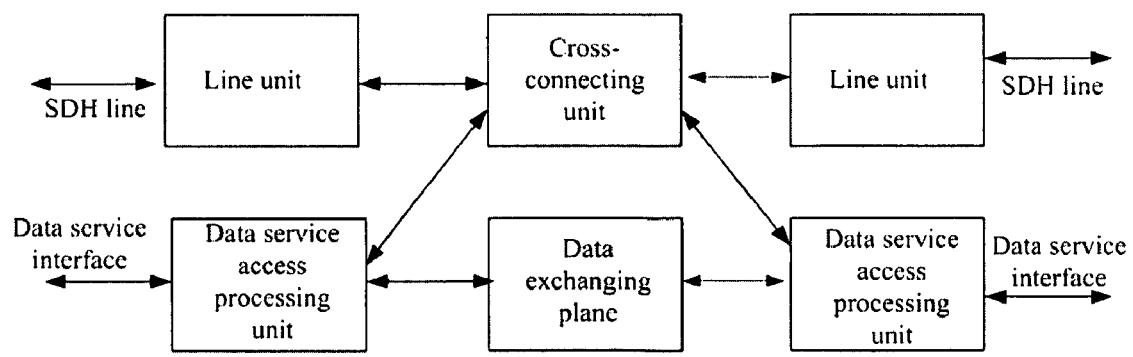
FIG. 2 is a schematic diagram of another packet service scheduling method of prior art.
Figure 3:
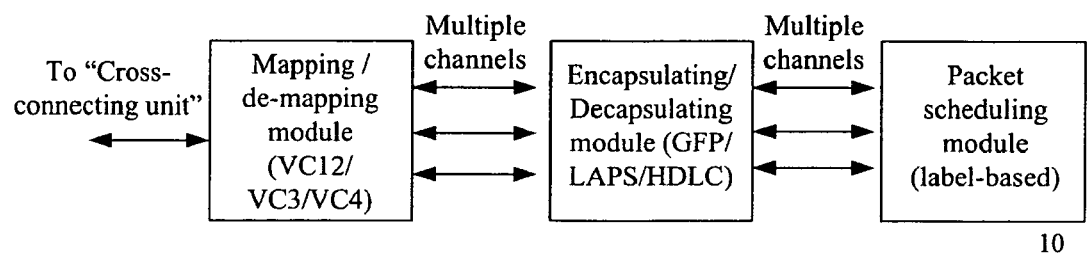
FIG. 3 is a block diagram of an internal structure of a service scheduling unit according to an embodiment of the present invention.

As shown in FIG. 3, a service scheduling unit according to an embodiment of the present invention establishes a data channel connection with one end of a cross-connecting unit in a digital communication system which is typically of SDH or another type of transmission unit of OTN, and performs service scheduling for packet services of a data service access processing unit and a line unit which establish a data channel connection with the other end of the cross-connecting unit, and the service scheduling unit comprises the following modules.

A de-mapping module which is used to receive a virtual container or virtual container group from the cross-connecting unit in the system, and to extract an encapsulated data stream from the virtual container or the virtual container group for completing separation of the encapsulated data stream therefrom.

A decapsulating module which is used to decapsulate the encapsulated data stream from the de-mapping module into one or more independent data frames.

A packet scheduling module which is provided with a plurality of output ports, and is used to receive the decapsulated data frame from the decapsulating module, to read a label from the data frame, to determine a corresponding output port based upon the label, and to forward the data frame via the output port.

An encapsulating module which is used to receive the data frame forwarded by the packet scheduling module and to encapsulate the data frame at the Data Link Layer.

A mapping module which is used to receive the encapsulated data frame and to map the data frame to the virtual container or the virtual container group of the cross-connecting unit.

The mapping module and the de-mapping module can be integrated into a mapping/de-mapping module, and the encapsulating module and the decapsulating module can be integrated into an encapsulating/decapsulating module.

A plurality of channels can be provided between the encapsulating/decapsulating module and the mapping/de-mapping module and between the encapsulating/decapsulating module and the packet scheduling module.

After a service needing to be scheduled enters the service scheduling unit, the service passes the mapping/de-mapping module and the encapsulating/decapsulating module sequentially, and arrives at the packet scheduling module for final scheduling.

Figure 4:
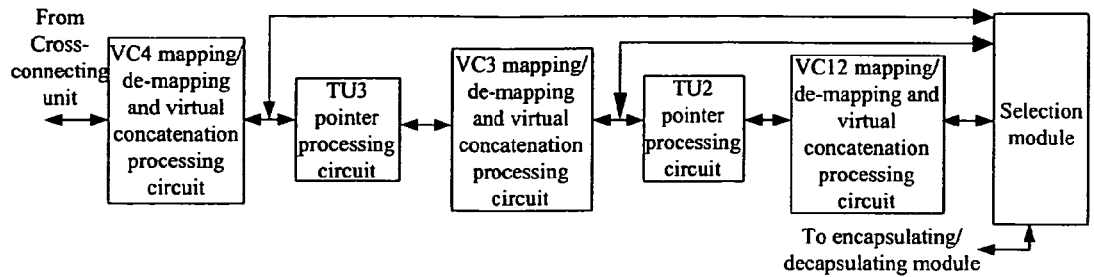
FIG. 4 is a block diagram of an internal structure of a mapping/de-mapping module in the service scheduling unit according to the embodiment of the present invention.

The mapping/de-mapping module is used to mainly load a data frame to a virtual container or virtual container group or extract a data frame from the virtual container or the virtual container group. Virtual container group refers to several virtual containers bound together through an adjacent or virtual concatenation. According to the embodiment of the present invention, the mapping/de-mapping module of the service scheduling unit supports virtual containers or virtual container group with various granularities, so as to perform scheduling between services of the virtual containers or the virtual container group with different granularities. For example, there are, but not limited to, VC12, VC3, VC4 (VCn: Virtual Container n, a container of level n) for the SDH and there are, but not limited to, VT1.5 (Virtual Tributary 1.5, a virtual tributary of level 1.5), STS-1, STS-3C (STS-n: Synchronous Transport Signal level n) for a SONET, etc. FIG. 4 is a block diagram of an internal structure of a mapping/de-mapping module according to the embodiment of the present invention, and the mapping/de-mapping module comprises a selection module, and also comprises a VC4 mapping/de-mapping and virtual concatenation processing circuit, a TU3 (Tributary Unit 3) pointer processing circuit, a VC3 mapping/de-mapping and virtual concatenation processing circuit, a TU12 (Tributary Unit 12) pointer processing circuit and a VC12 mapping/de-mapping and virtual concatenation processing circuit connected sequentially. The selection module is connected with the three virtual concatenation processing circuits. The mapping/de-mapping and the virtual concatenation can be performed for data of different granularities (VC12, VC3, VC4) through the selection module dependent upon a network configuration. The mapping/de-mapping module can also perform LCAS protocol when the virtual concatenation is adopted.

Figure 5:
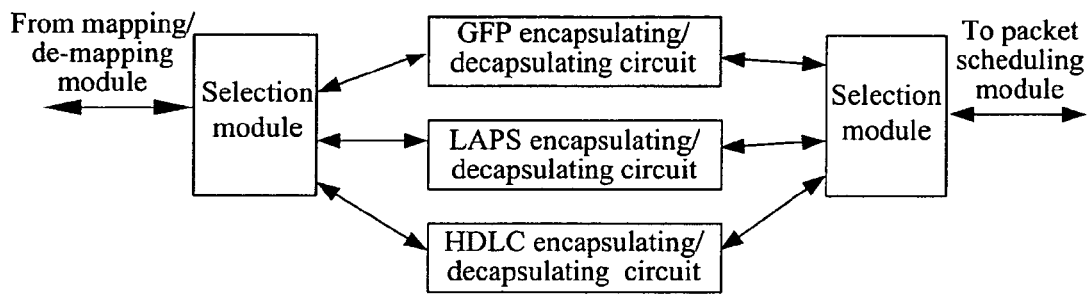
FIG. 5 is a block diagram of an internal structure of an encapsulating/decapsulating module in the service scheduling unit according to the embodiment of the present invention.

The encapsulating/decapsulating module mainly performs the encapsulation and decapsulation of a data frame at the Data Link Layer. The encapsulation at the Data Link Layer is for the main purpose of framing. FIG. 5 is a block diagram of an internal structure of an encapsulating/decapsulating module according to the embodiment of the present invention, comprising a first selection module, a second selection module and multiple protocol encapsulating/decapsulating circuits, such as a GFP encapsulating/decapsulating circuit, a Link Access Procedure-SDH (LAPS) encapsulating/decapsulating circuit and a High-level Data Link Control (HDLC) encapsulating/decapsulating circuit, which are well known in the prior art and thus descriptions thereof will be omitted here. The first selection module is connected with the mapping/de-mapping module and selects one of the multiple protocol encapsulating/decapsulating circuits, and the second selection module is connected with the packet scheduling module and selects one of the multiple protocol encapsulating/decapsulating circuits. The multiple protocol encapsulating/decapsulating circuits are respectively corresponding to different physical channels each of which can be respectively configured with a different encapsulation protocol so as to perform the encapsulation/decapsulation for different protocols. According to the embodiment of the invention, encapsulation protocols supported by the encapsulating/decapsulating module of the service scheduling unit mainly includes the GFP, the LAPS, the HDLC, etc, so as to perform scheduling between different encapsulation services.

The encapsulating/decapsulating module also comprises a GFP CID identifying module, and can perform a service scheduling for a data stream of a GFP linear frame based upon CID information in a GFP extension frame head. That is, for a GFP frame from a different physical channel (an individual virtual container or virtual container group), the encapsulating/decapsulating module can find a CID field in an extension head in the GFP frame, and forward a data frame with a particular CID to a particular physical channel (an individual virtual container or virtual container group) in accordance with the network configuration. Such a scheduling mechanism can save the cost of the encapsulation/decapsulation and increase the speed of processing.

Figure 6:
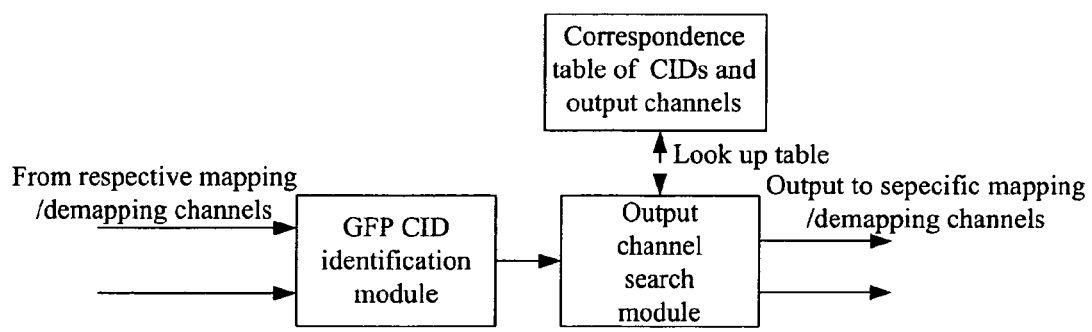
FIG. 6 is a schematic diagram of a service scheduling at a GFP level performed by the encapsulating/decapsulating module according to the embodiment of the present invention.

As shown in FIG. 6, the GIF CID identifying module processes data packets from the respective mapping/de-mapping channels, and finds the CID field in the GFP capsulation, and an output channel searching module searches a "correspondence table of CIDs and output channels" in accordance with a value of the CID field identified by the GFP CID identifying module to get a particular number of the mapping/de-mapping channel, and the data packets are forwarded to the particular mapped/de-mapped channel.

The packet scheduling module is mainly label-based packet scheduling. That is, with respect to service data frames from different channels, where, for example, GFP, LAPS or HDLC is decapsulated, the packet scheduling module locates label information in the service data frame, and forwards the data frame with a specific label to a specific channel in accordance with the network configuration. Here, the label information may be configured differently dependent upon the different channels, and may be located differently dependent upon different protocols. The label information can be located through a pre-configuration or a default offset. Specifically, the label information may be VLAN label of 802.1 Q, a stacked VLAN label of q-in-q, a label of MPLS L2 VPN, etc.

According to the embodiment of the invention, the service scheduling unit also comprises a fault alarming module that is used to monitor a status of the service scheduling unit and to report an abnormal status to the cross-connecting unit The abnormal status includes a fault and an alarm, where the fault includes degradation of overhead performance of a virtual container detected by the mapping/de-mapping module in the service scheduling unit, and the alarm includes degradation of encapsulation performance detected by the encapsulating/decapsulating module, degradation of performance of a data frame detected by the packet scheduling module, a failure of a unit power supply, a clock circuit and the like etc.

With the above service scheduling unit according to the embodiment of the invention, there are provided various packet service scheduling methods, which can ensure "1+1" or "1:1" protection for the service scheduling unit.

Figure 7:
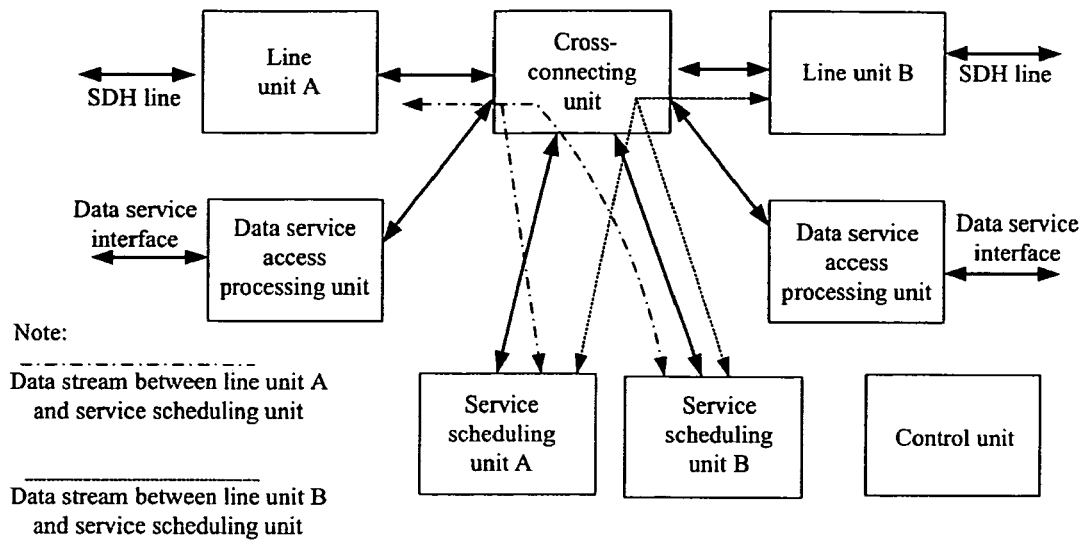
FIG. 7 is a schematic diagram of a packet service scheduling method according to an embodiment of the present invention.

FIG. 7 is a schematic diagram of a packet service scheduling method according to an embodiment of the present invention. There are provided two service scheduling units A and B with identical functions and configurations, both of which are connected with a cross-connecting unit in a system, where two cross-connecting units may be provided for a "1+1" protection.

Services needing to be processed by a service scheduling unit may be from a line unit, or from a data service access processing unit, and after being cross-scheduled by the cross-connecting unit, those data streams of the services are forwarded to a service scheduling unit for scheduling.

Figure 8:
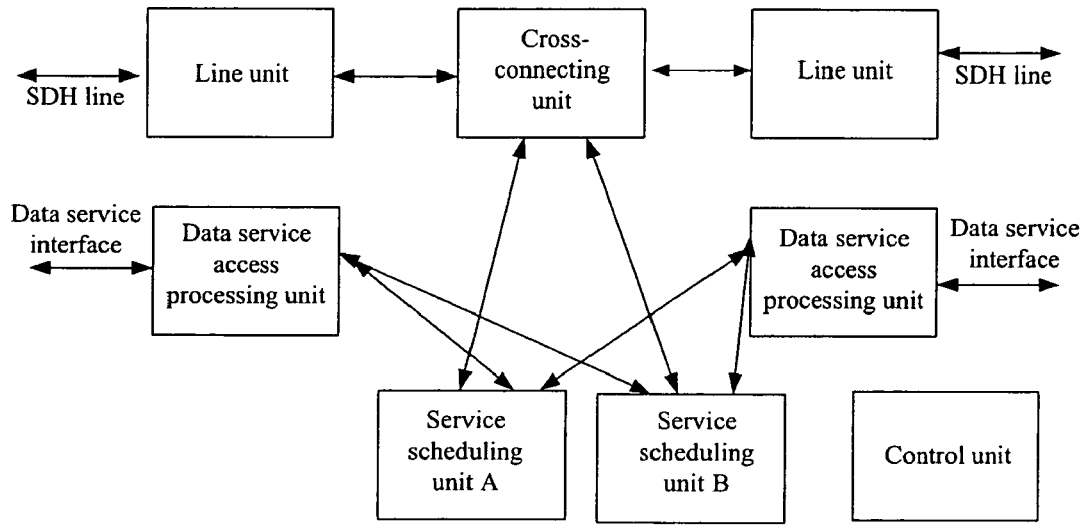
FIG. 8 is a schematic diagram of a packet service scheduling method according to another embodiment of the present invention.

FIG. 8 is a schematic diagram of another packet service scheduling method according to an embodiment of the present invention. As shown in the figure, a locally-accessing data service can be forwarded from a data service access processing unit to a service scheduling unit directly.

In case the packet service scheduling is carried out in the mode as shown in FIG. 7, when a "1+1" protection is provided for the service scheduling units, the cross-connecting unit copies the service and forwards it to the service scheduling units A and B, which will accordingly receive, process and transmit the identical service. If the service scheduling units A and B both operate normally, the cross-connecting unit receives the identical service streams from the service scheduling units A and B, either of which is selected and cross-scheduled to the line unit and/or the data service access processing unit.

If one of the service scheduling units A and B fails, assuming that A fails, then A reports the fault to a control unit which, according to the embodiment of the invention, performs control over all the other elements in the system (without showing controlling relationship therebetween), and will not be described repeatedly since it is well known in the prior art, and the control unit instructs the cross-connecting unit to select the service stream from B. In a different system, the service scheduling unit A may also report to the cross-connecting unit directly, and the cross-connecting unit may select the service stream from B.

In case a "1:1" protection is provided in the packet service scheduling mode as shown in FIG. 7, during a normal operation, the services that are received, processed and transmitted by the service scheduling units A and B are not identical and may have priorities. If one of the service scheduling units A and B fails, assuming that A fails, then A reports to the control unit which in turn instructs the cross-connecting unit to switch one or more of the services needing protection originally cross-scheduled to A to the service scheduling unit B, which may replace one or more services being processed by B. Which service(s) to be replaced within B can be set in advance and may be one(s) with a low priority. In a different system, the service scheduling unit A may also report to the cross-connecting unit directly, and the cross-connecting unit switches the service(s) requiring the protection of A to B.

In case a packet service scheduling is carried out in the mode as shown in FIG. 8, when a "1+1" protection is provided for the service scheduling units, the cross-connecting unit and/or the data service access processing unit may copy the services, which need to be scheduled, and forwards it to the service scheduling units A and B, which will accordingly receive, process and transmit the identical services. If the service scheduling units A and B both operate normally, the cross-connecting unit receives identical service streams from the service scheduling units A and B, either of which is selected and cross-scheduled to the line unit. The data service access processing unit receives the identical service streams from the service scheduling units A and B and selects one therefrom for processing.

If one of the service scheduling units A and B fails, assuming that A fails, then A reports the fault to a control unit which in turn instructs the cross-connecting unit and the data service access processing unit to select the service stream from B. In a different system, the service scheduling unit A may also report to the cross-connecting unit and the data service access processing unit directly, and the cross-connecting unit and the data service access processing unit select the service stream from B.

When a "1:1" protection is provided in the packet service scheduling mode as shown in FIG. 8, during a normal operation, the services that are received, processed and transmitted by the service scheduling units A and B are not identical, and may have priorities. If one of the service scheduling units A and B fails, assuming that A fails, then A reports it to the control unit which in turn instructs the cross-connecting unit and the data service access processing unit to switch one or more of the services requiring protection originally cross-scheduled to A to the service scheduling unit B, which may replace one or more services being processed by B. Which service(s) to be replaced within B can be set in advance and may be one(s) with a low priority. In a different system, the service scheduling unit A may also report the fault to the cross-connecting unit and the data service access processing unit directly, and the cross-connecting unit and the data service access processing unit may switch the service(s) requiring the protection within A to B.

In the above method according to the embodiment of the invention, the fault may include degradation of overhead performance of a virtual container and an alarm detected by the mapping/de-mapping module in the service scheduling unit, degradation of performance of the capsulation and an alarm detected by the encapsulating/decapsulating module, degradation of performance of a data frame and an alarm, detected by the packet scheduling module, a failure of a unit power supply, a clock circuit and the like, etc.

The above "1+1" or "1:1" protection mechanisms may be channel- (service stream-) based. Taking "1+1" protection based on service streams as an example, the cross-connecting unit may copy services to the service scheduling units A and B, which will accordingly receive, process and transmit the identical services. The cross-connecting unit receives identical service streams from the service scheduling units A and B, either of which is selected and cross-scheduled to a line unit or a service processing unit The service scheduling unit may monitor each service stream for a fault A fault of a certain service stream, for example, the $M^{th}$ service stream of the service scheduling unit A may result from a failure of a partial circuit on the service scheduling unit related to the $M^{th}$ service stream. At this time, the service scheduling unit A reports the failure to the control unit which in turn instructs the cross-connecting unit to select a corresponding certain service stream from B. In a different system, the service scheduling unit A may also report the failure to the cross-connecting unit directly, and the cross-connecting unit may select the corresponding certain service stream from B.

With the provision of the service scheduling units, the data service access processing unit can be simply designed, and the complex function of a service scheduling can be performed at the service scheduling units. This can decrease a total cost of the system effectively in case there are a large number of service accesses.

Although in the embodiments of the present invention, SDH, OTN or SONET is taken as an example of a digital communication system, the digital communication system is not limited to SDH, OTN or SONET, rather, it can be any digital communication system which can provide TDM services as would be readily understood by those skilled in the art.

While the present invention has been illustrated and described with reference to some preferred embodiment thereof, it will be apparent to those skilled in the art that it may be possible to make various modifications of the present invention without departing the scope thereof.

What is claimed is:

1. A service scheduling unit, which establishes a data channel connection with one end of a cross-connecting unit in a digital communication system, for scheduling packet services from a data service access processing unit and a line unit which establish a data channel connection with the other end of the cross-connecting unit, comprising:
    a de-mapping module, adapted to receive a virtual container or virtual container group from the cross-connecting unit in the digital communication system, and to extract an encapsulated data stream from the virtual container or the virtual container group for completing separation of the encapsulated data stream therefrom;
    a decapsulating module, adapted to decapsulate the encapsulated data stream from the de-mapping module into one or more independent data frames;
    a packet scheduling module with multiple output ports, adapted to receive the decapsulated data frame from the decapsulating module, read a label from the data frame, determine a corresponding output port based upon the label, and forward the data frame via the output ports;
    an encapsulating module, adapted to receive the decapsulated data frame forwarded by the packet scheduling module and to encapsulate the data frame at the Data Link Layer; and
    a mapping module, adapted to receive the encapsulated data frame and map the data frame to the virtual container or the virtual container group of the cross-connecting unit.

2. The service scheduling unit according to claim 1, further comprising a fault alarming module adapted to monitor the service scheduling unit and report an abnormal status to the cross-connecting unit.

3. The service scheduling unit according to claim 2, wherein the mapping module and the de-mapping module are integrated into a mapping/de-mapping module, and the encapsulating module and the decapsulating module are integrated into an encapsulating/decapsulating module.

4. The service scheduling unit according to claim 1, wherein the mapping module and the de-mapping module are integrated into a mapping/de-mapping module, and the encapsulating module and the decapsulating module are integrated into an encapsulating/decapsulating module.

5. The service scheduling unit according to claim 4, wherein a plurality of channels are provided between the encapsulating/decapsulating module and the mapping/de-mapping module and between the encapsulating/decapsulating module and the packet scheduling module.

6. The service scheduling unit according to claim 4, wherein the mapping/de-mapping module comprises a selection module, a VC4 mapping/de-mapping and virtual concatenation processing circuit, a TU3 pointer processing circuit, a VC3 mapping/de-mapping and virtual concatenation processing circuit, a TU12 pointer processing circuit and a VC 12 mapping/de-mapping and virtual concatenation processing circuit connected sequentially, and the selection module is connected with the three virtual concatenation processing circuits to select one of the three so as to perform scheduling between the services of the virtual container or the virtual container group with different granularities.

7. The service scheduling unit according to claim 4, wherein the encapsulating/decapsulating module further comprises a GFP CID identifying module, and for a GFP frame from a different physical channel, finds a CID field in an extension head in the GFP frame, and forwards the GFP frame directly to a corresponding physical channel in accordance with a value of the CID field.

8. The service scheduling unit according to claim 4, wherein the encapsulating/decapsulating module comprises a first selection module, a second selection module and a plurality of protocol encapsulating/decapsulating circuits, wherein the first selection module is connected with the mapping/de-mapping module and selects one of the plurality of protocol encapsulating/decapsulating circuits, and the second selection module is connected with the packet scheduling module and selects one of the plurality of protocol encapsulating/decapsulating circuits, and the plurality of protocol encapsulating/decapsulating circuits respectively correspond different physical channels and perform encapsulation/decapsulation for different protocols.

9. The service scheduling unit according to claim 8, wherein the plurality of protocol encapsulating/decapsulating circuits include a GFP encapsulating/decapsulating circuit, a LAPS encapsulating/decapsulating circuit and an HDLC encapsulating/decapsulating circuit.

10. A packet service scheduling method for a digital communication system comprising a line unit, a data service access processing unit and a cross-connecting unit, comprising:

configuring two service scheduling units with identical functions and configurations to be connected with the cross-connecting unit in the digital communication system;

copying, by the cross-connecting unit, services to be scheduled from the line unit and/or the data service access processing unit to the service scheduling units which accordingly perform identical receipt, processing and transmission procedures for the services;

in case the service scheduling units both operate normally, receiving by the cross-connecting unit identical service streams from the service scheduling units, either of which is selected and cross-scheduled to the line unit and/or the data service access processing unit in the digital communication system;

in case one of the service scheduling units fails, reporting by the failed service scheduling unit the fault to a control unit which instructs the cross-connecting unit to select the service stream from the other service scheduling unit which operates normally, or reporting the fault directly to the cross-connecting unit which selects the service stream from the normally-operating one.

11. A packet service scheduling method for a digital communication system comprising a line unit, a data service access processing unit and a cross-connecting unit, comprising:

configuring two service scheduling units with identical functions and configurations to be connected with the cross-connecting unit and the data service access processing unit in the digital communication system;

copying services to be scheduled by the cross-connecting unit and/or the data service access processing unit to the service scheduling units which accordingly perform identical receiving, processing and transmitting procedures for the services;

in case the service scheduling units both operate normally, receiving by the cross-connecting unit identical service streams from the service scheduling units, either of which is selected and cross-scheduled to the line unit in the digital communication system, and receiving by the data service access processing unit the identical service streams from the service scheduling units, either of which is selected for processing; and in case one of the service scheduling units fails, reporting by the failed service scheduling unit the fault to a control unit which instructs the cross-connecting unit and the data service access processing unit to select the service stream from the normally-operating one, or reporting by the failed one the fault directly to the cross-connecting unit and the data service access processing unit which select the service stream from the normally-operating one.

12. A packet service scheduling method for a digital communication system comprising a line unit, a data service access processing unit and a cross-connecting unit, comprising:

configuring two service scheduling units with identical functions and configurations to be connected with the cross-connecting unit in the digital communication system;

assigning, by the cross-connecting unit, services to be scheduled from the line unit and/or the data service access processing unit to the service scheduling units;

in case the service scheduling units both operate normally, receiving by the cross-connecting unit service streams from the service scheduling units, which are cross-scheduled to the line unit and/or the data service access processing unit in the digital communication system; and in case one of the service scheduling units fails, reporting by the failed service scheduling unit the fault to a control unit which instructs the cross-connecting unit to switch a service originally assigned to the failed one to the normally-operating scheduling unit to continue the service scheduling process, or reporting by the failed one the fault to the cross-connecting unit which switches a service originally assigned to the failed one to the normally-operating one to continue the service scheduling process.

13. A packet service scheduling method for a digital communication system comprising a line unit, a data service access processing unit and a cross-connecting unit, comprising:

configuring two service scheduling units with identical functions and configurations to be connected with the cross-connecting unit and the data service access processing unit in the digital communication system;

assigning, by the cross-connecting unit and/or the data service access processing unit, services to be scheduled to the service scheduling units; in case the service scheduling units both operate normally, receiving by the cross-connecting unit service streams from the service scheduling units, which are cross-scheduled to the line unit and/or the data service access processing unit in the digital communication system; in case one of the service scheduling units fails, reporting by the failed service scheduling unit the fault to a control unit which instructs the cross-connecting unit to switch a service originally assigned to the failed one to the normally-operating one to continue the service scheduling process, or reporting by the failed one the fault to the cross-connecting unit which switches a service originally assigned to the failed one to the normally-operating one to continue the service scheduling process.

14. The packet service scheduling method according to claim 13, wherein the services assigned to the service scheduling units have priorities, and a service with a low priority being processed is replaced by a service with a high priority during the service switching in case a service scheduling unit fails.

* * * * *